(12) United States Patent
Sekii

(10) Patent No.: US 10,591,718 B2
(45) Date of Patent: Mar. 17, 2020

(54) ROTARY DRIVE APPARATUS

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 171 days.

(21) Appl. No.: 15/663,885

(22) Filed: Jul. 31, 2017

(65) Prior Publication Data

US 2018/0217374 A1    Aug. 2, 2018

(30) Foreign Application Priority Data

Jan. 27, 2017    (JP) .................................. 2017-012936

(51) Int. Cl.
*G02B 26/10*    (2006.01)
*H02K 7/14*    (2006.01)
*H02K 7/02*    (2006.01)

(52) U.S. Cl.
CPC .............. *G02B 26/105* (2013.01); *H02K 7/02* (2013.01); *H02K 7/14* (2013.01); *Y02E 60/16* (2013.01)

(58) Field of Classification Search
CPC ................ G02B 26/105; G02B 7/1821; G02B 26/0816; G02B 7/182; G02B 26/12; G02B 26/121; H02K 7/14; H02K 7/02; Y02E 60/16

See application file for complete search history.

(56) References Cited

U.S. PATENT DOCUMENTS

| 5,600,477 | A | * | 2/1997 | Pepe | .................... | G02B 7/1821 |
| | | | | | | 359/214.1 |
| 2002/0152963 | A1 | * | 10/2002 | Vijverberg | ............ | A01J 5/0175 |
| | | | | | | 119/14.08 |
| 2004/0165642 | A1 | * | 8/2004 | Lamont | ................ | G02B 7/1821 |
| | | | | | | 372/107 |
| 2017/0317555 | A1 | * | 11/2017 | Nishimura | ........... | G02B 7/1821 |

FOREIGN PATENT DOCUMENTS

JP        2010-021105 A    1/2010

OTHER PUBLICATIONS

Mizukami, "Rotary Drive Apparatus and Manufacturing Method for Rotary Drive Apparatus", U.S. Appl. No. 15/663,882, filed Jul. 31, 2017.
Sekii, "Rotary Drive Apparatus", U.S. Appl. No. 15/663,883, filed Jul. 31, 2017.

* cited by examiner

*Primary Examiner* — Kimberly N. Kakalec
(74) *Attorney, Agent, or Firm* — Keating & Bennett

(57) ABSTRACT

This rotary drive apparatus is arranged to rotate a flywheel arranged to support an optical component arranged to reflect incoming light coming from a light source or allow the incoming light to pass therethrough, and includes a motor including a rotating portion; and the flywheel, the flywheel being supported by the motor and arranged to rotate about a central axis extending in a vertical direction. The flywheel includes a plate-shaped accommodating portion in which the optical component is arranged; a bottom surface arranged at (Continued)

a bottom portion of the accommodating portion, and arranged to slant with respect to at least one of two opposed side surfaces of the optical component; and a base surface arranged to be in contact with at least a portion of another one of the two opposed side surfaces of the optical component.

9 Claims, 10 Drawing Sheets

ROTARY DRIVE APPARATUS

CROSS REFERENCE TO RELATED APPLICATIONS

This application claims the benefit of priority to Japanese Patent Application No. 2017-012936 filed on Jan. 27, 2017. The entire contents of this application are hereby incorporated herein by reference.

BACKGROUND OF THE INVENTION

1. Field of the Invention

The present invention relates to a rotary drive apparatus.

2. Description of the Related Art

A known scanner apparatus used for position recognition in combination with a head-mounted display (HMD) or the like typically has installed therein a mirror arranged to reflect incoming light coming from a light source, and a light guide member arranged to guide the incoming light and reflected light. Such a known optical apparatus including a mirror and a light guide member is described in, for example, JP-A 2010-021105.

In the optical apparatus described in JP-A 2010-021105, a reflecting surface arranged to reflect illuminating light coming from a light source, and the light guide member, which is arranged to guide the illuminating light, are defined by a single monolithic member. In addition, the light guide member is fixed to a base. Therefore, depending on precision of the light guide member, the position and angle of the reflecting surface may be changed, which may affect emission of reflected light from the reflecting surface.

SUMMARY OF THE INVENTION

A rotary drive apparatus according to a preferred embodiment of the present invention is arranged to rotate a flywheel arranged to support an optical component arranged to reflect incoming light coming from a light source or allow the incoming light to pass therethrough, and includes a motor including a rotating portion; and the flywheel, the flywheel being supported by the motor and arranged to rotate about a central axis extending in a vertical direction. The flywheel includes a plate-shaped accommodating portion in which the optical component is arranged; a bottom surface arranged at a bottom portion of the accommodating portion, and arranged to slant with respect to at least one of two opposed side surfaces of the optical component; and a base surface arranged to be in contact with at least a portion of another one of the two opposed side surfaces of the optical component.

According to the above preferred embodiment of the present invention, the accommodating portion of the flywheel has a slanting bottom portion, and the optical component is arranged in the accommodating portion with at least a portion of the optical component being in contact with a side surface of the accommodating portion. This contributes to easily positioning the optical component, and to preventing a displacement of the optical component.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor, which will be described below, is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a light source is arranged with respect to the motor is defined as an upper side. The shape of each member or portion and relative positions of different members or portions will be described based on the above assumptions. It should be noted, however, that the above definitions of the vertical direction and the upper side are not meant to restrict in any way the orientation of a rotary drive apparatus according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

1. First Preferred Embodiment 1-1. Structure of Rotary Drive Apparatus

Figure 1:
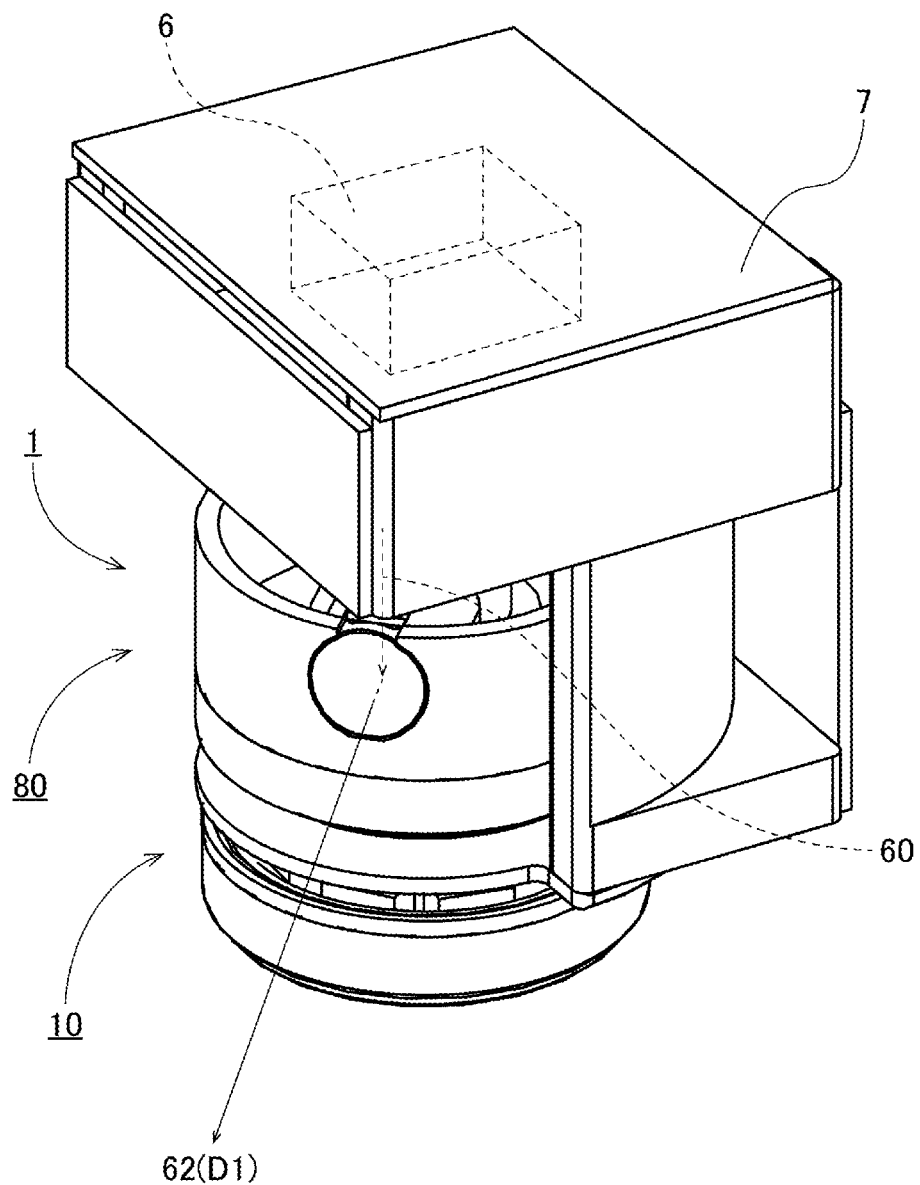
FIG. 1 is a perspective view of a rotary drive apparatus, a light source, and a frame according to a first preferred embodiment of the present invention.

FIG. 1 is a perspective view of a rotary drive apparatus 1, a light source 6, and a frame 7 according to a first preferred embodiment of the present invention. The rotary drive apparatus 1 is an apparatus arranged to support and rotate a mirror 61, which is arranged to reflect incoming light 60 coming from the light source 6 in a radial direction (i.e., a first radial direction D1), and a lens 63, and emit reflected light 62 obtained by the mirror 61 reflecting the incoming light 60 to an outside of the rotary drive apparatus 1 through the lens 63, which will be described below, while rotating the mirror 61, which will be described below. The frame 7, in which the light source 6 is installed, is arranged above the rotary drive apparatus 1. The frame 7 is fixed to a case or the like in which the rotary drive apparatus 1 is arranged. The incoming light 60, which travels downward along a central axis 9 of a motor 10, is emitted from the light source 6. In the present preferred embodiment, the light source 6 and the frame 7 are arranged outside of the rotary drive apparatus 1. Note, however, that each of the light source 6 and the frame 7 may alternatively be included in the rotary drive apparatus 1.

Referring to FIG. 1, the rotary drive apparatus 1 includes the motor 10 and a flywheel 80.

1-2. Structure of Motor

Figure 2:
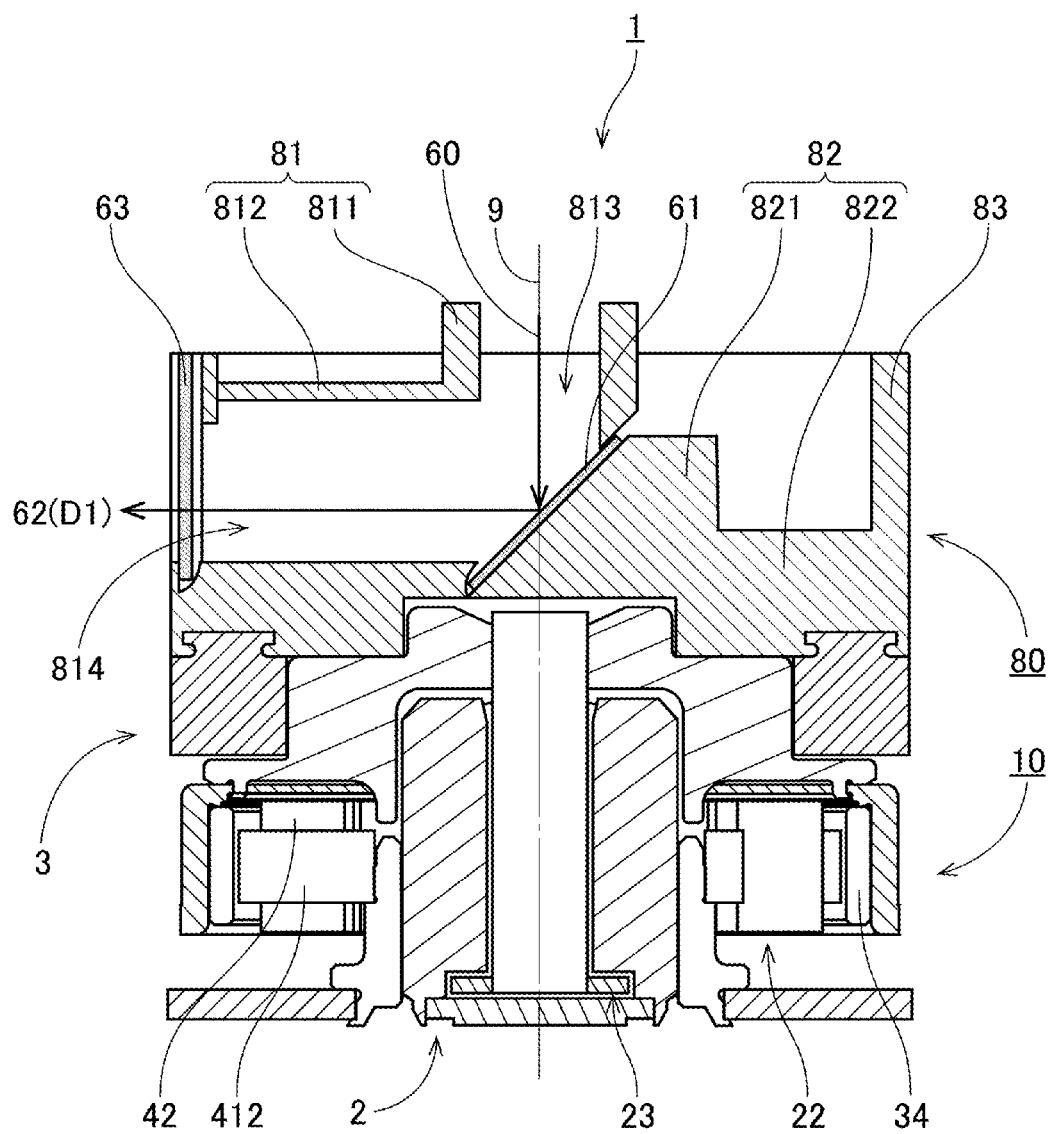
FIG. 2 is a vertical sectional view of the rotary drive apparatus according to the first preferred embodiment.

Next, the structure of the motor 10 will now be described below. FIG. 2 is a vertical sectional view of the rotary drive apparatus 1 according to the first preferred embodiment.

Referring to FIG. 2, the motor 10 includes a stationary portion 2 including a stator 22, and a rotating portion 3 including a magnet 34. The stationary portion 2 is arranged to be stationary relative to the case or the like in which the rotary drive apparatus 1 is arranged. The rotating portion 3 is supported through a bearing portion 23 to be rotatable about the central axis 9, which extends in the vertical direction, with respect to the stationary portion 2.

Once electric drive currents are supplied to coils 42 included in the stationary portion 2, magnetic flux is generated around each of a plurality of teeth 412, which are magnetic cores for the coils 42. Then, interaction between the magnetic flux of the teeth 412 and magnetic flux of the magnet 34 included in the rotating portion 3 produces a circumferential torque between the stationary portion 2 and the rotating portion 3, so that the rotating portion 3 is caused to rotate about the central axis 9 with respect to the stationary portion 2. Thus, the flywheel 80, which is rotatably held by the rotating portion 3, is caused to rotate about the central axis 9 together with the rotating portion 3.

As the bearing portion 23, a fluid dynamic bearing, in which a portion of the stationary portion 2 and a portion of the rotating portion 3 are arranged opposite to each other with a gap in which a lubricating oil exists therebetween and which is arranged to induce a fluid dynamic pressure in the lubricating oil, is used, for example. Note that a bearing of another type, such as, for example, a rolling-element bearing, may alternatively be used as the bearing portion 23.

1-3. Structure of Flywheel

Next, the structure of the flywheel 80 will now be described below. Hereinafter, reference will be made to FIGS. 1 and 2 appropriately as well as FIGS. 3, 4, and 5.

Figure 3:
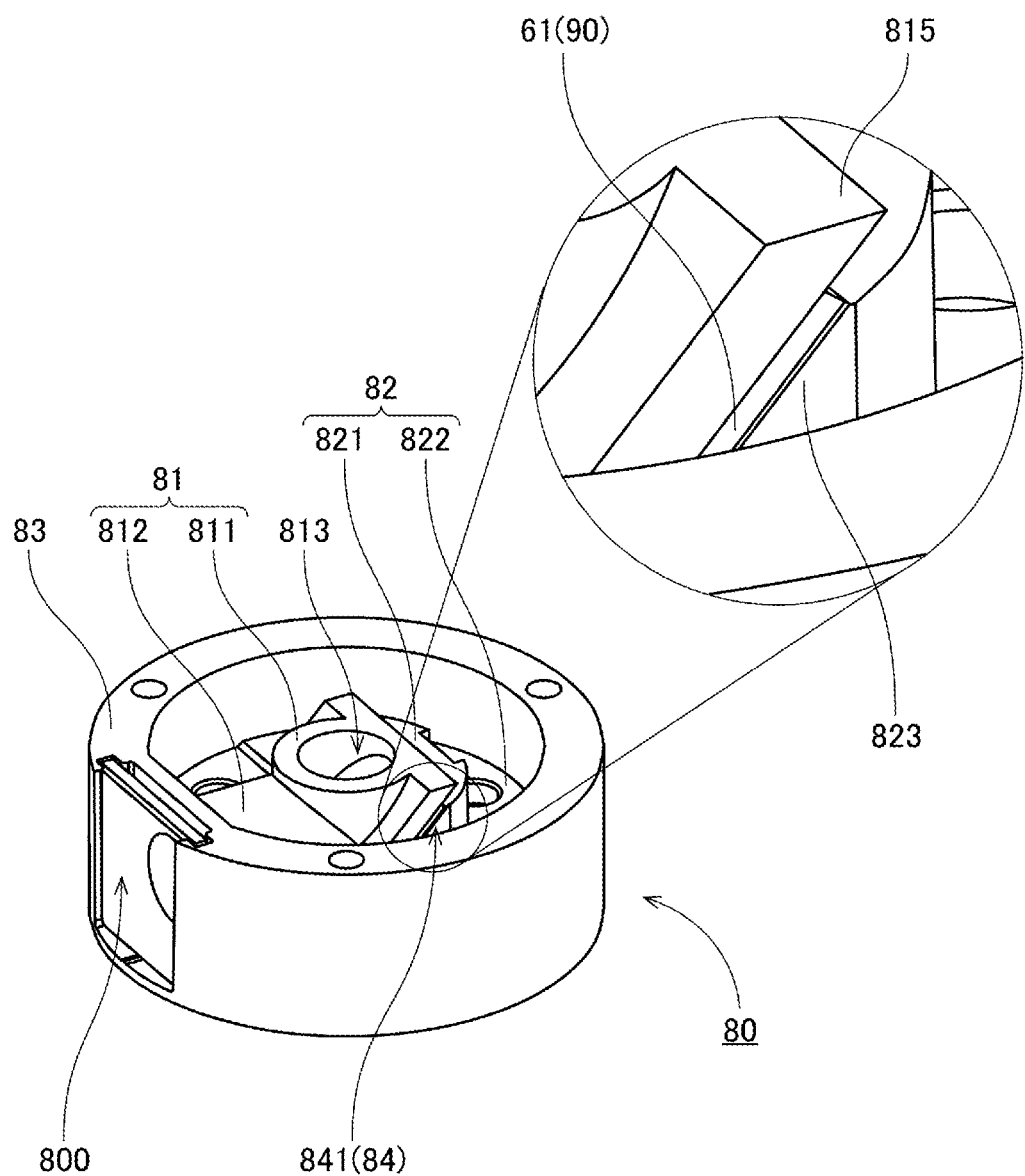
FIG. 3 is a perspective view of a flywheel according to the first preferred embodiment.
Figure 4:
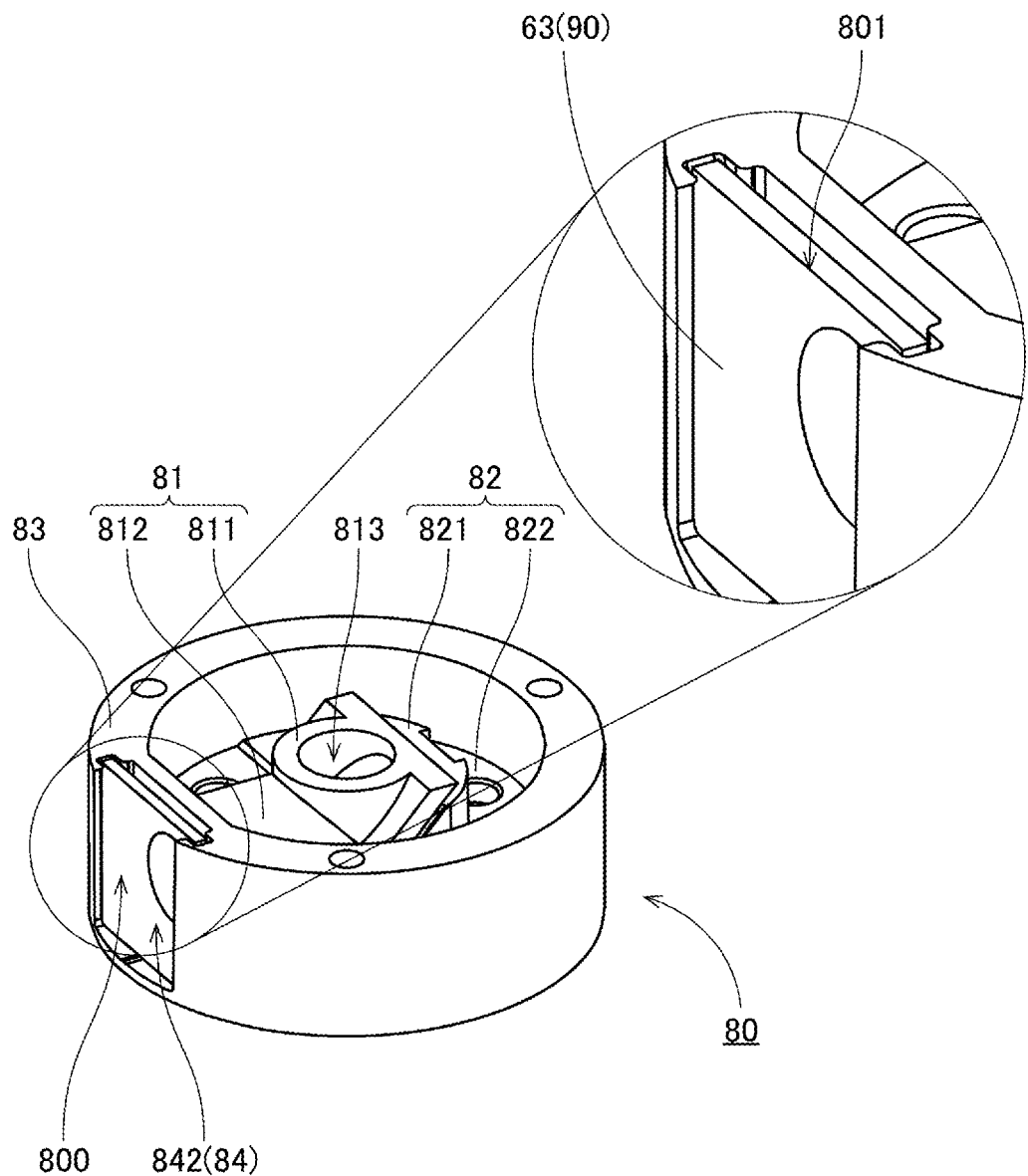
FIG. 4 is a perspective view of the flywheel according to the first preferred embodiment.

Each of FIGS. 3 and 4 is a perspective view of the flywheel 80 according to the first preferred embodiment. The flywheel 80 is supported by an upper end portion of the rotating portion 3 of the motor 10, and is arranged to rotate about the central axis 9 together with the rotating portion 3. The flywheel 80 is fixed to an upper surface of the rotating portion 3 through, for example, engagement, an adhesive, or the like. Referring to FIGS. 3 and 4, the flywheel 80 includes optical components 90, an upper support member 81, a lower support member 82, an outer cylindrical portion 83, accommodating portions 84, which will be described below, bottom surfaces 85, which will be described below, and base surfaces 86, which will be described below. The optical components 90 include the mirror 61, which is arranged to reflect the incoming light 60, and the lens 63, which is arranged to allow the reflected light 62 obtained by the mirror 61 reflecting the incoming light 60 to pass therethrough. A resin, for example, is used as a material of the flywheel 80.

Figure 5:
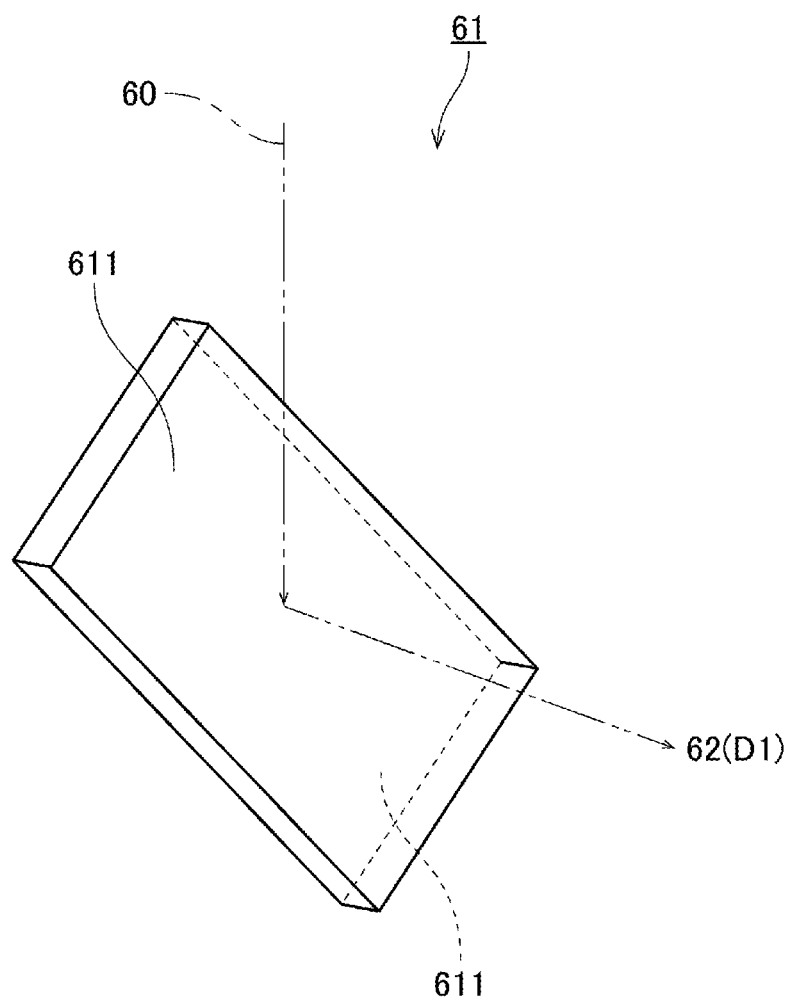
FIG. 5 is a perspective view of a mirror according to the first preferred embodiment.

FIG. 5 is a perspective view of the mirror 61 according to the first preferred embodiment. Referring to FIG. 5, the mirror 61 is in the shape of a flat rectangular parallelepiped. In other words, the mirror 61 is in the shape of a rectangular plate. In a situation in which the mirror 61 is fixed to the flywheel 80, the mirror 61 has at least a portion thereof arranged on the central axis 9, and is inclined at an angle of 45° with respect to the axial direction and the first radial direction D1. In addition, the mirror 61 is arranged to extend in the shape of a plate, is fitted in an accommodating portion 842, which will be described below, and is fixed with at least a portion of the mirror 61 being in contact with a base surface 862, which will be described below. This contributes to easily positioning the mirror 61, and to preventing a displacement of the mirror 61. The incoming light 60 impinges on a central portion of an upper surface (i.e., an upper one of two opposed side surfaces 611), which is a reflecting surface, of the mirror 61. The central portion of the upper surface refers to the entire upper surface, excluding a peripheral portion of the upper surface. A fully reflective mirror, for example, is used as the mirror 61.

The upper support member 81 is a tubular member including an upper vertical cylindrical portion 811 and an upper horizontal cylindrical portion 812. In the present preferred embodiment, the upper vertical cylindrical portion 811, the upper horizontal cylindrical portion 812, the lower support member 82, and the outer cylindrical portion 83 are defined as a single monolithic member by a resin injection molding process. Note, however, that the upper vertical cylindrical portion 811, the upper horizontal cylindrical portion 812, the lower support member 82, and the outer cylindrical portion 83 may alternatively be defined by separate members.

The upper vertical cylindrical portion 811 is a cylindrical portion arranged to extend in the axial direction from a radially inner end portion of the upper horizontal cylindrical portion 812. An inner circumferential surface of the upper vertical cylindrical portion 811 is arranged to extend in parallel with the central axis 9 of the motor 10. A cavity 813 radially inside of the upper vertical cylindrical portion 811 is arranged to define a light path.

The upper horizontal cylindrical portion 812 is a cylindrical portion arranged to extend outward in a radial direction (i.e., in the first radial direction D1) from an outer circumferential portion of the upper vertical cylindrical portion 811. A cavity 814 inside of the upper horizontal cylindrical portion 812 is joined to the cavity 813 radially inside of the upper vertical cylindrical portion 811 at right angles. In addition, the cavity 814 inside of the upper horizontal cylindrical portion 812, the mirror 61, and the lens 63 are arranged to overlap with one another when viewed in the first radial direction D1.

Further, the upper support member 81 includes an upper periphery support portion 815 arranged to extend outward from a lower end portion of the upper vertical cylindrical portion 811 and a radially inner end portion of the upper horizontal cylindrical portion 812. The upper periphery support portion 815 is arranged to be in contact with the peripheral portion of the upper surface (i.e., the upper one of the two opposed side surfaces 611) of the mirror 61 in the situation in which the mirror 61 is fixed to the flywheel 80. This contributes to more securely fixing the mirror 61.

The outer cylindrical portion 83 is a cylindrical member arranged to extend along the central axis 9 radially outside of the upper support member 81. An outer circumferential surface of the outer cylindrical portion 83 defines a portion of an outer circumferential surface of the flywheel 80. In addition, a through hole 800, which is arranged to pass through the outer cylindrical portion 83 in the first radial direction D1, is defined in the outer cylindrical portion 83 at a circumferential position radially outside of the upper horizontal cylindrical portion 812. In addition, a radially outer end portion of the upper horizontal cylindrical portion 812 is joined to an inner circumferential surface of a portion of the outer cylindrical portion 83 which surrounds the through hole 800. The outer cylindrical portion 83 and the upper support member 81 are thus joined to each other.

The lower support member 82 includes a lower vertical cylindrical portion 821 and a joining portion 822. The lower vertical cylindrical portion 821 is a columnar member arranged to extend in the axial direction, and having at least a portion thereof arranged below the upper support member 81. Note that the lower vertical cylindrical portion 821 may alternatively be arranged to have a tubular structure and include a cavity (not shown) radially inside thereof. Also note that the cavity (not shown) radially inside thereof may be arranged to define a light path.

In addition, the lower support member 82 includes a lower periphery support portion 823 arranged to extend outward from an upper end portion of the lower vertical cylindrical portion 821. The lower periphery support portion 823 is arranged to be in contact with a peripheral portion of the mirror 61 in the situation in which the mirror 61 is fixed to the flywheel 80. This contributes to more securely fixing the mirror 61.

The joining portion 822 is arranged to extend radially inward from an inner circumferential surface of the outer cylindrical portion 83, and is joined to an outer circumferential surface of the lower vertical cylindrical portion 821. Thus, the outer cylindrical portion 83 and the lower support member 82 are joined to each other.

A portion of the outer cylindrical portion 83 and a portion of the joining portion 822 are recessed radially inward from outer circumferential surfaces thereof at one circumferential position. Each of these portions is arranged to axially and radially overlap with a radially outer portion of the upper horizontal cylindrical portion 812 of the upper support member 81 in the situation in which the mirror 61 is fixed to the flywheel 80. In the present preferred embodiment, the outer cylindrical portion 83 and the radially outer portion of the upper horizontal cylindrical portion 812 are joined to each other in the vicinity of these portions when the upper support member 81, the lower support member 82, and the outer cylindrical portion 83 are defined by the resin injection molding process.

Similarly to the mirror 61, the lens 63 is in the shape of a plate. The lens 63 is fitted in an accommodating portion 841, which will be described below, and is fixed with at least a portion of the lens 63 being in contact with a base surface 861, which will be described below. This contributes to easily positioning the lens 63, and to preventing a displacement of the lens 63. The lens 63 is arranged to extend in the shape of a plate, and is arranged at right angles to the first radial direction D1, that is, in parallel with the central axis 9, in a situation in which the lens 63 is fixed in the flywheel 80. The reflected light 62, which is obtained by the mirror 61 reflecting the incoming light 60 in the flywheel 80, passes through a central portion of the lens 63. The central portion of the lens 63 refers to the entire lens 63, excluding a peripheral portion of the lens 63.

The incoming light 60, which is emitted from the light source 6, enters the above-described flywheel 80 from above an upper surface of the flywheel 80, and travels downward along the central axis 9 in the cavity 813 radially inside of the upper vertical cylindrical portion 811. The incoming light 60 is then reflected by the mirror 61, and, further, travels outward in the first radial direction D1 in the cavity 814 inside of the upper horizontal cylindrical portion 812, and is emitted out of the rotary drive apparatus 1 through the lens 63.

The mirror 61 of the flywheel 80 is arranged to reflect the incoming light 60 from the light source 6 and emit the reflected light 62 to the outside while rotating about the central axis 9 together with the rotating portion 3 of the motor 10. Therefore, the first radial direction D1, which is a direction in which the reflected light 62 is emitted, also rotates together with the rotating portion 3. Thus, a wide range can be irradiated with light. Note that the outer circumferential surface of the flywheel 80 has a reflectivity lower than that of a surface of the mirror 61. This contributes to preventing diffuse reflection of the incoming light 60 from the light source 6.

Note that the rotary drive apparatus 1 may further include, in addition to the flywheel 80 arranged to emit the reflected light 62 to the outside in the first radial direction D1, another flywheel (not shown) which is arranged to emit reflected light to the outside in a second radial direction different from the first radial direction D1, and which is arranged, for example, below the motor 10. In this case, a half mirror the transmissivity and reflectivity of which are substantially equal is used as the mirror 61. Then, a half of the incoming light 60 which impinges on the mirror 61 in the flywheel 80 is reflected in the first radial direction D1 to be emitted to the outside. In addition, a remaining half of the incoming light 60 which impinges on the mirror 61 passes through the mirror 61, and travels downward in the cavity (not shown) radially inside of the lower vertical cylindrical portion 821. Further, a through hole (not shown) passing through the motor 10 in the axial direction is defined around the central axis 9 in the motor 10. Thus, the portion of the incoming light 60 which has passed through the mirror 61 passes through the through hole and reaches the other flywheel arranged below the motor 10. In this other flywheel, this portion of the incoming light 60 is reflected in the second radial direction to be emitted to the outside.

When light is emitted out in the two different directions, i.e., the first radial direction D1 and the second radial direction, as described above, light beams that are emitted out in the two different directions take different times to reach an object to be irradiated with light while the motor 10 is rotating, and this makes it possible to precisely recognize the three-dimensional position of the object in a space. Note that the other flywheel may alternatively be arranged in a rotary drive apparatus (not shown) other than the rotary drive apparatus 1 including the flywheel 80.

1-4. Structures of Accommodating Portions

Next, the structures of the accommodating portions 84 will now be described below. Hereinafter, reference will be made to FIGS. 1 to 5 appropriately as well as FIGS. 6 and 7.

First, one of the accommodating portions 84 in which the lens 63, which is one of the optical components 90, is arranged will now be described below. The one of the accommodating portions 84 in which the lens 63 is arranged will be hereinafter referred to as the "accommodating portion 841". In addition, the bottom surface 85 of the one of the accommodating portions 84 in which the lens 63 is arranged will be hereinafter referred to as a "bottom surface 851". Further, the base surface 86 with which one of two opposed side surfaces 631 of the lens 63 is arranged to be in contact will be hereinafter referred to as the "base surface 861".

Figure 6:
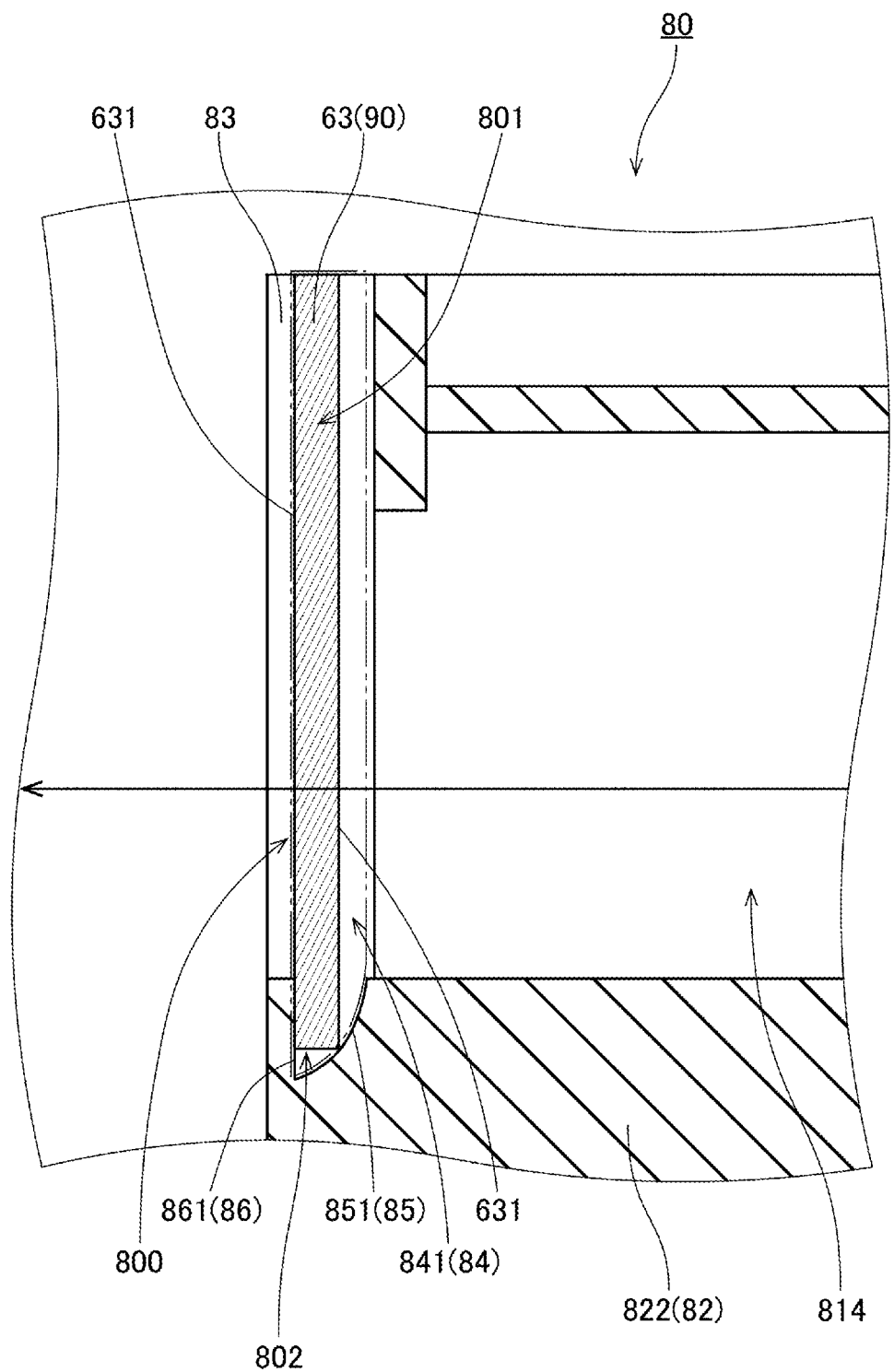
FIG. 6 is a partial vertical sectional view of the flywheel according to the first preferred embodiment.

FIG. 6 is a partial vertical sectional view of the flywheel 80 according to the first preferred embodiment. Referring to FIGS. 4 and 6, a cut portion 801 is defined in a radially outer portion of a portion of the outer cylindrical portion 83 above the through hole 800 at one circumferential position. At least a portion of each of an outer circumferential surface and an upper surface of the cut portion 801 is arranged to be in communication with an outside of the flywheel 80. In addition, the accommodating portion 841 is defined by the cut portion 801, the through hole 800, and an outer recessed portion 802, which is recessed downward from a surface of the lower support member 82 which faces a lower end of the through hole 800. In FIG. 6, the range of the accommodating portion 841 is represented by a chain double-dashed line.

The accommodating portion 841 is a plate-shaped space arranged to extend at right angles to a horizontal direction, that is, in parallel with the central axis 9. The accommodating portion 841 is arranged to have a radial width greater than a radial thickness of the lens 63. In addition, the base surface 861, which is a radially outer portion of a surface defining the outer recessed portion 802, which is included in the accommodating portion 841, is at right angles to a radial direction, that is, in parallel with the central axis 9. The lens 63 is inserted into the accommodating portion 841 from above the cut portion 801, that is, from outside of the flywheel 80, downward in parallel with the central axis 9. The bottom surface 851, which is arranged at a bottom portion of the accommodating portion 841, is arranged to slant with respect to the base surface 861 and a radially inner one of the two opposed side surfaces 631 of the lens 63 arranged in the accommodating portion 841. Thus, when the lens 63 is inserted in a downward direction, the lens 63 is guided by the bottom surface 851 and slides radially outward. Then, a lower portion of a radially outer one of the two side surfaces 631 of the lens 63 is brought into contact with the base surface 861. Further, in the course of the arrangement of the lens 63 in the accommodating portion 841 of the flywheel 80, the lens 63 makes line contact with the bottom surface 851 instead of making surface contact therewith. This contributes to easily positioning the lens 63 even when a surface defining a portion of the accommodating portion 841 has a low dimensional precision or has unevenness or a distortion, and to preventing a displacement of the lens 63.

After the lower portion of the radially outer one of the two side surfaces 631 of the lens 63 is brought into contact with the base surface 861, the lower portion, now being in contact with the base surface 861, is fixed to the base surface 861 through adhesion. Thus, the lens 63 is securely fixed to the base surface 861, which contributes to more effectively preventing a displacement of the lens 63 with respect to the base surface 861.

In the present preferred embodiment, the bottom surface 851 is a curved surface whose slant angle with respect to the base surface 861 gradually increases with decreasing distance from a lower end portion of the base surface 861. This makes the amount of the resin of the lower support member 82 used around the accommodating portion 841 smaller than in a case where the bottom surface 851 is a flat surface, and leads to a cost reduction.

In addition, the base surface 861 is a surface perpendicular to a lower surface of the flywheel 80. This allows the lens 63 to be arranged perpendicularly to the lower surface of the flywheel 80 in a radially outer portion of the accommodating portion 841. This allows the reflected light 62 to be emitted in the first radial direction D1, which is perpendicular to the axial direction, out of the flywheel 80.

Next, one of the accommodating portions 84 in which the mirror 61, which is one of the optical components 90, is arranged will now be described below. The one of the accommodating portions 84 in which the mirror 61 is arranged will be hereinafter referred to as the "accommodating portion 842". In addition, the bottom surface 85 of the one of the accommodating portions 84 in which the mirror 61 is arranged will be hereinafter referred to as a "bottom surface 852". Further, the base surface 86 with which one of the side surfaces 611 of the mirror 61 is arranged to be in contact will be hereinafter referred to as the "base surface 862".

Figure 7:
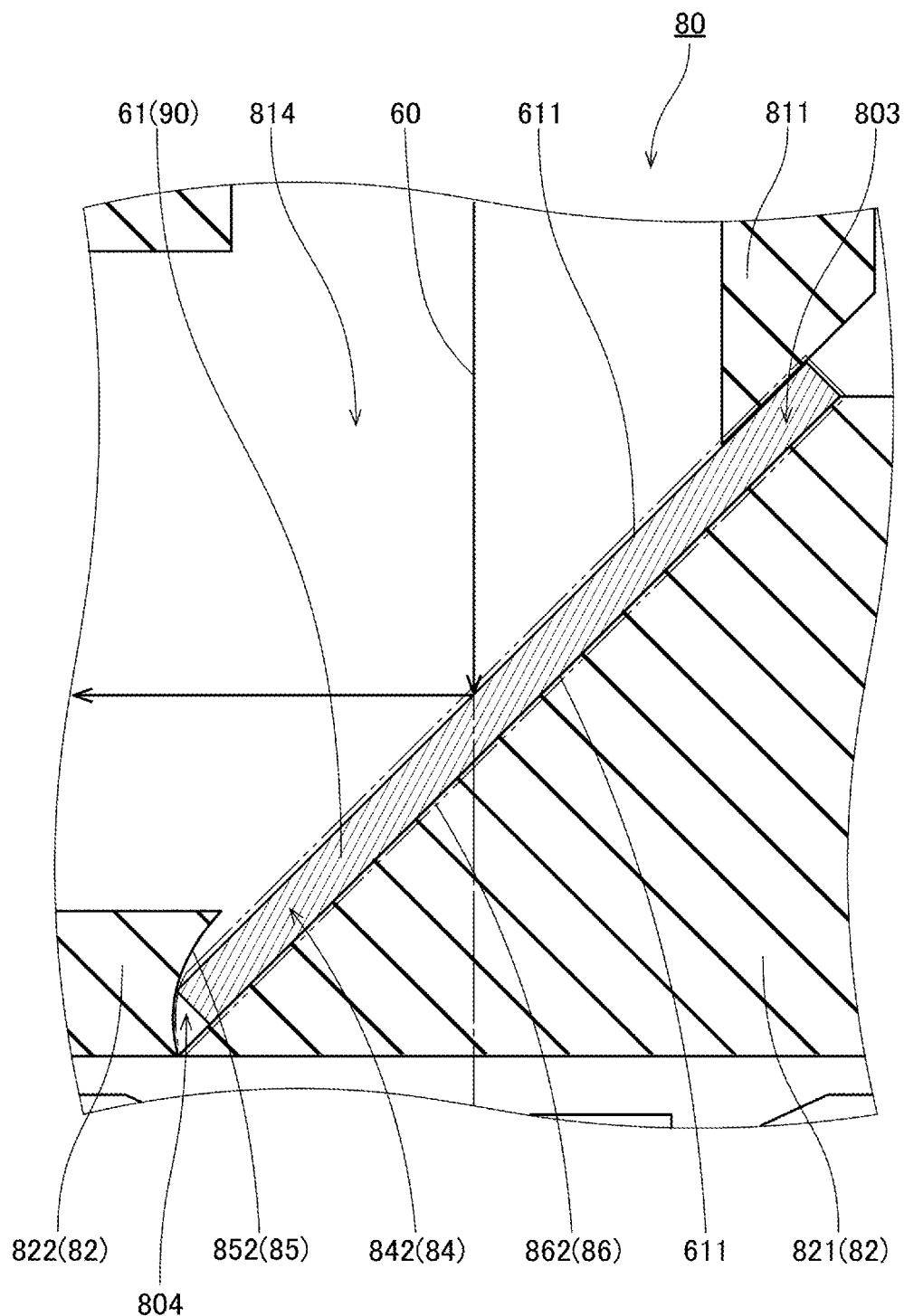
FIG. 7 is a partial vertical sectional view of the flywheel according to the first preferred embodiment.

FIG. 7 is a partial vertical sectional view of the flywheel 80 according to the first preferred embodiment. Referring to FIGS. 3 and 7, at least a portion of a lower surface of the upper vertical cylindrical portion 811 and at least a portion of an upper surface of the lower vertical cylindrical portion 821 are arranged opposite to each other with a gap 803 therebetween. In addition, the accommodating portion 842 is defined by the gap 803, a portion of the cavity 814, and an inner recessed portion 804, which is recessed inward from an upper surface of the lower support member 82. In FIG. 7, the range of the accommodating portion 842 is represented by a chain double-dashed line.

The accommodating portion 842 is a plate-shaped space inclined at an angle of 45° with respect to the central axis 9 and the first radial direction D1. The accommodating portion 842 is arranged to have a width greater than a radial thickness of the mirror 61. In addition, the base surface 862, which is the upper surface of the lower vertical cylindrical portion 821 and which defines a portion of the accommodating portion 842, is an inclined surface angled at 45° with respect to the central axis 9 and the first radial direction D1. The mirror 61 is inserted into the accommodating portion 842 from above the gap 803, that is, from outside of the flywheel 80, downward at an angle of 45° with respect to the central axis 9 and the first radial direction D1. The bottom surface 852, which is arranged at a bottom portion of the accommodating portion 842, is arranged to slant with respect to the base surface 862 and one of the two opposed side surfaces 611 of the mirror 61 arranged in the accommodating portion 842 which faces the cavity 814. Thus, when the mirror 61 is inserted obliquely downward, the mirror 61 is guided by the bottom surface 852 and slides toward the lower vertical cylindrical portion 821. Then, one of the two side surfaces 611 of the mirror 61 which faces the lower vertical cylindrical portion 821 is brought into contact with the base surface 862. Further, in the course of the arrangement of the mirror 61 in the accommodating portion 842 of the flywheel 80, the mirror 61 makes line contact with the bottom surface 852 instead of making surface contact therewith. This contributes to easily positioning the mirror 61 even when a surface defining a portion of the accommodating portion 842 has a low dimensional precision or has unevenness or a distortion, and to preventing a displacement of the mirror 61.

After the one of the two side surfaces 611 of the mirror 61 which faces the lower vertical cylindrical portion 821 is brought into contact with the base surface 862, this side surface 611, now being in contact with the base surface 862, is fixed to the base surface 862 through adhesion. Thus, the mirror 61 is securely fixed to the base surface 862, which contributes to more effectively preventing a displacement of the mirror 61 with respect to the base surface 862.

In the present preferred embodiment, the bottom surface 852 is a curved surface whose slant angle with respect to the base surface 862 gradually increases with decreasing distance from a lower end portion of the base surface 862. This makes the amount of the resin of the lower support member 82 used around the accommodating portion 842 smaller than in a case where the bottom surface 852 is a flat surface, and leads to a cost reduction.

2. Example Modifications

While preferred embodiments of the present invention have been described above, it is to be understood that the present invention is not limited to the above-described preferred embodiments.

Figure 8:
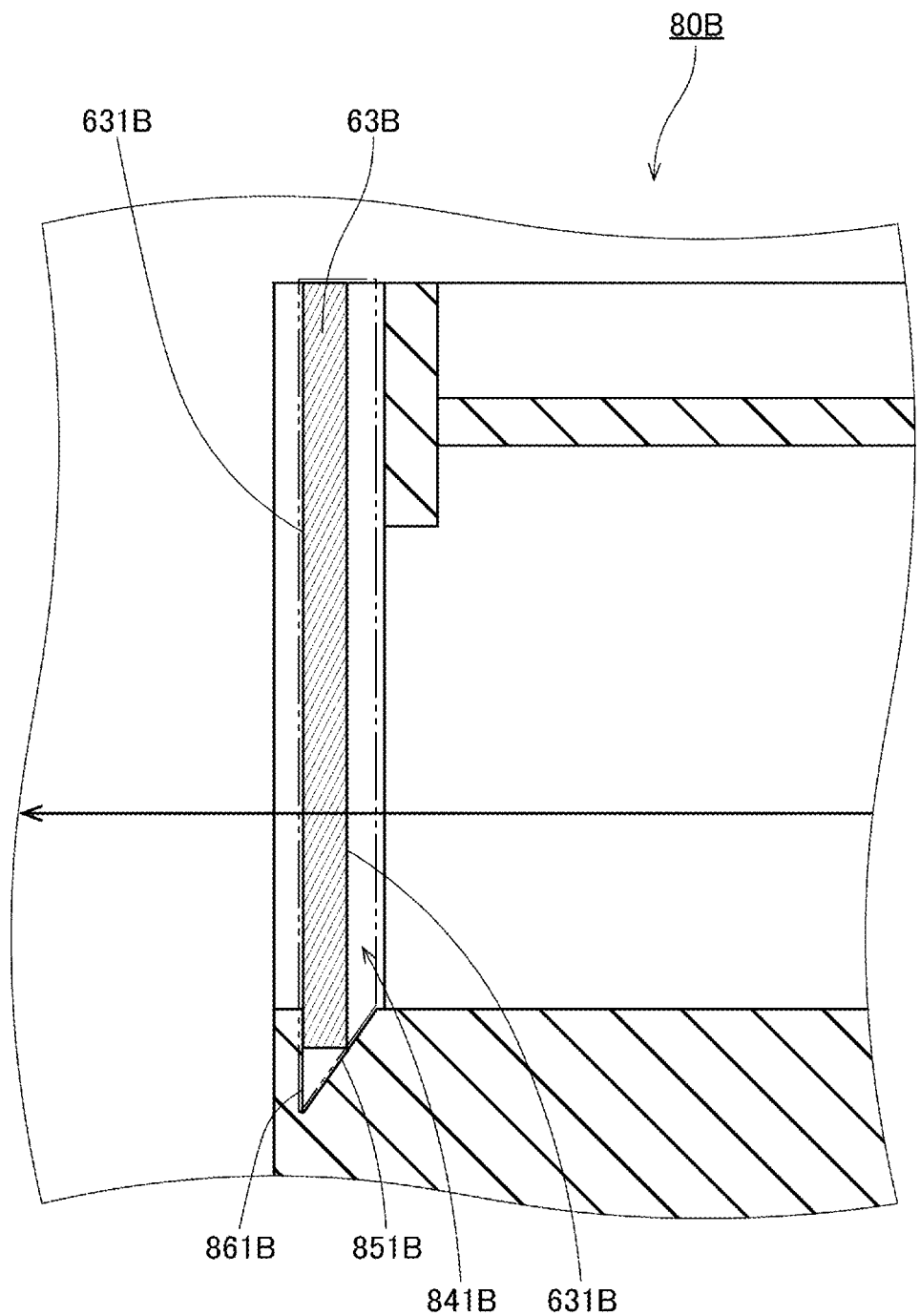
FIG. 8 is a partial vertical sectional view of a flywheel according to a modification of the first preferred embodiment.

FIG. 8 is a partial vertical sectional view of a flywheel 80B according to a modification of the first preferred embodiment. In the modification illustrated in FIG. 8, a bottom surface 851B, which is arranged at a bottom portion of an accommodating portion 841B, is a flat surface. The bottom surface 851B is arranged to slant with respect to a base surface 861B and two opposed side surfaces 631B of a lens 63B arranged in the accommodating portion 841B. Thus, when the lens 63B is inserted in a downward direction, the lens 63B is guided by the bottom surface 851B and slides radially outward. Then, a lower portion of a radially outer one of the two side surfaces 631B of the lens 63B is brought into contact with the base surface 861B. Further, in the course of the arrangement of the lens 63B in the accommodating portion 841B of the flywheel 80B, the lens 63B makes line contact with the bottom surface 851B instead of making surface contact therewith. This contributes to easily positioning the lens 63B even when a surface defining a portion of the accommodating portion 841B has a low dimensional precision or has unevenness or a distortion, and to preventing a displacement of the lens 63B. Note that, similarly, a bottom surface of an accommodating portion in which a mirror is accommodated may be a flat surface, and the bottom surface may be arranged to slant with respect to a base surface and two opposed side surfaces of a mirror arranged in the accommodating portion, in a preferred embodiment of the present invention.

Figure 9:
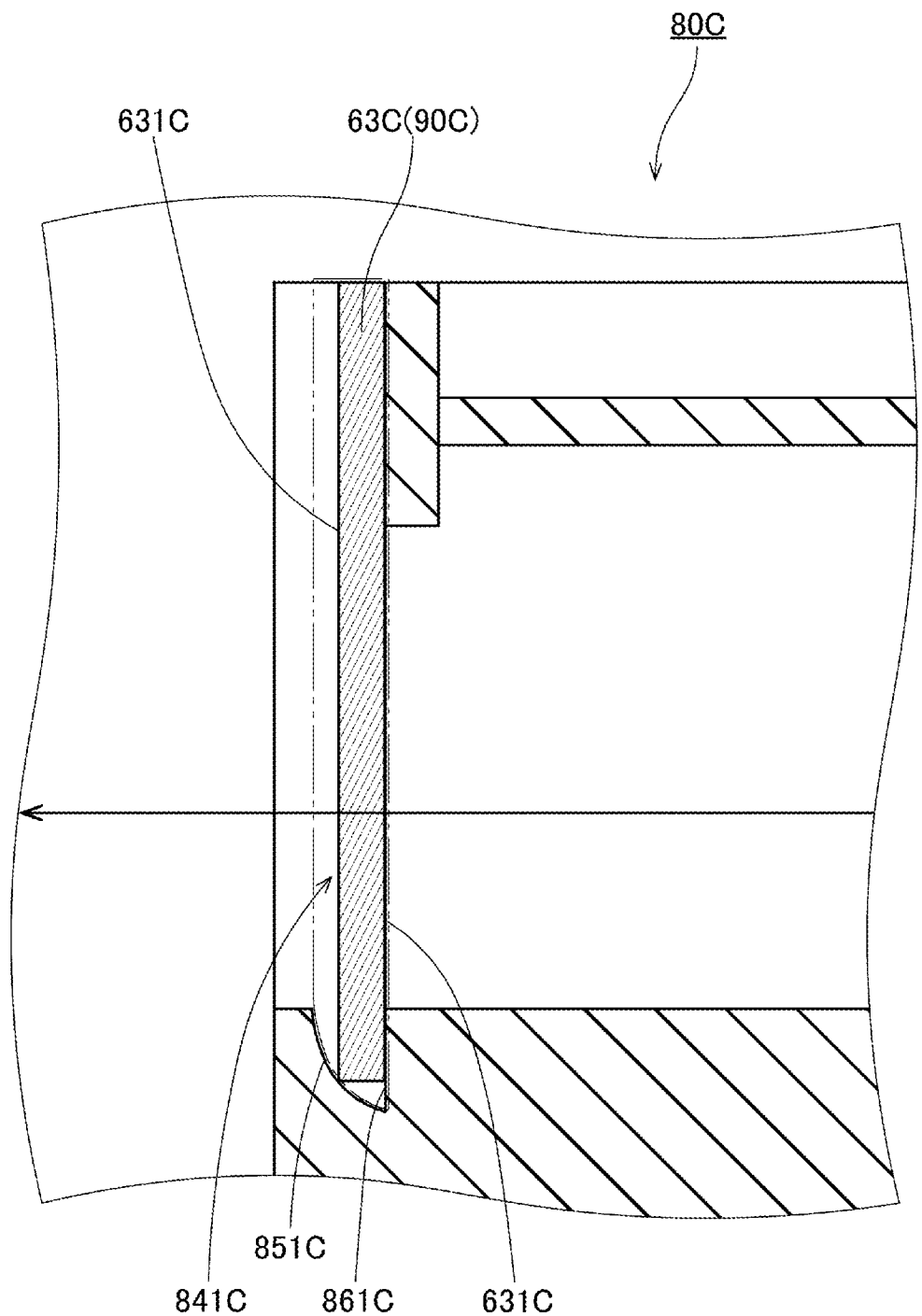
FIG. 9 is a partial vertical sectional view of a flywheel according to a modification of the first preferred embodiment.

FIG. 9 is a partial vertical sectional view of a flywheel 80C according to another modification of the first preferred embodiment. A bottom surface 851C, which is arranged at a bottom portion of an accommodating portion 841C, is arranged to slant with respect to a base surface 861C and a radially outer one of two opposed side surfaces 631C of a lens 63C arranged in the accommodating portion 841C. Thus, when the lens 63C is inserted in a downward direction, the lens 63C is guided by the bottom surface 851C and slides radially inward. Then, a lower portion of a radially inner one of the two side surfaces 631C of the lens 63C is brought into contact with the base surface 861C. Further, in the course of the arrangement of the lens 63C in the accommodating portion 841C of the flywheel 80C, the lens 63C makes line contact with the bottom surface 851C instead of making surface contact therewith. This contributes to easily positioning the lens 63C even when a surface defining a portion of the accommodating portion 841C has a low dimensional precision or has unevenness or a distortion, and to preventing a displacement of the lens 63C.

As described above, the bottom surface 851C, which is arranged at the bottom portion of the accommodating portion 841C, is arranged to slant with respect to at least one of the two opposed side surfaces 631C of the lens 63C, and this allows a lower portion of the lens 63C to slide toward the base surface 861C along the bottom surface 851C when the lens 63C is inserted in the downward direction. In addition, the lens 63C is allowed to move while being in line contact with the bottom surface 851C to bring at least a portion of another one of the two side surfaces 631C of the lens 63C into contact with the base surface 861C. This contributes to easily positioning the lens 63C. Further, fixing the above portion of the lens 63C which is in contact with the base surface 861C to the base surface 861C through adhesion contributes to more effectively preventing a displacement of the lens 63C with respect to the base surface 861C.

Figure 10:
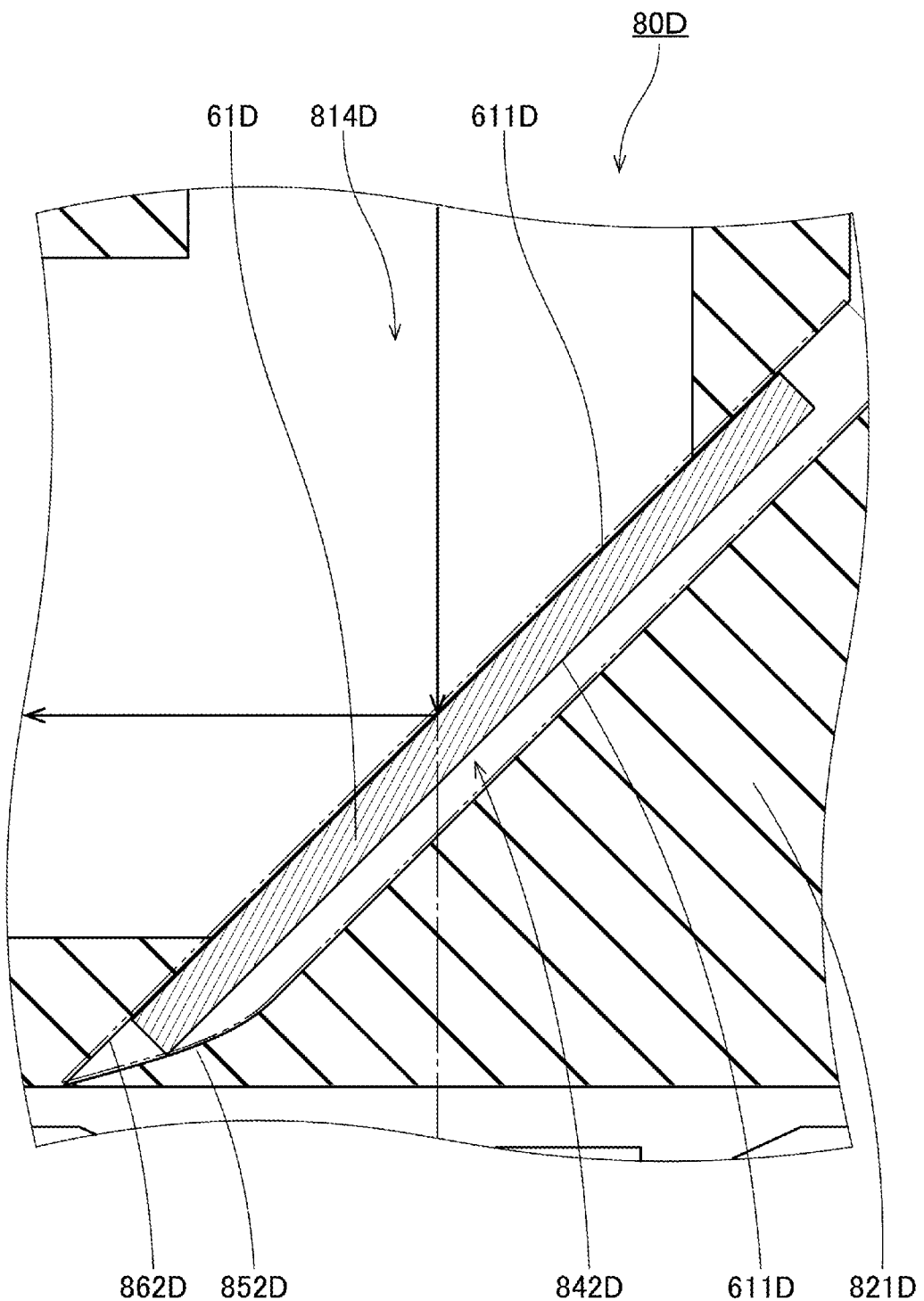
FIG. 10 is a partial vertical sectional view of a flywheel according to a modification of the first preferred embodiment.

FIG. 10 is a partial vertical sectional view of a flywheel 80D according to yet another modification of the first preferred embodiment. A bottom surface 852D, which is arranged at a bottom portion of an accommodating portion 842D, is arranged to slant with respect to a base surface 862D and one of two opposed side surfaces 611D of a mirror 61D arranged in the accommodating portion 842D which faces a lower vertical cylindrical portion 821D. Thus, when the mirror 61D is inserted obliquely downward, the mirror 61D is guided by the bottom surface 852D and slides toward a cavity 814D. Then, one of the two side surfaces 611D of the mirror 61D which faces the cavity 814D is brought into contact with the base surface 862D. Further, in the course of the arrangement of the mirror 61D in the accommodating portion 842D of the flywheel 80D, the mirror 61D makes line contact with the bottom surface 852D instead of making surface contact therewith. This contributes to easily positioning the mirror 61D even when a surface defining a portion of the accommodating portion 842D has a low dimensional precision or has unevenness or a distortion, and to preventing a displacement of the mirror 61D.

Note that a surface of a flywheel which defines a portion of an accommodating portion in which an optical component is arranged and which is arranged circumferentially opposite to the optical component may be a base surface in a preferred embodiment of the present invention. Then, a bottom surface arranged at a bottom portion of the accommodating portion may be arranged to slant with respect to the base surface and two circumferentially opposed side surfaces (which are different from the side surfaces in each of the first preferred embodiment and the above-described modifications thereof) of the optical component arranged in the accommodating portion. Thus, when the optical component is inserted in a downward direction, the optical component is guided by the bottom surface and slides in a circumferential direction. Then, at least a portion of one of the circumferentially opposed side surfaces of the optical component is brought into contact with the base surface. This contributes to preventing a circumferential displacement of the optical component. Note that, in a preferred embodiment of the present invention, a bottom surface arranged at a bottom portion of an accommodating portion may be arranged to slant upward or downward as it extends in the circumferential direction, and additionally slant upward or downward as it extends in a radial direction as in each of the first preferred embodiment and the above-described modifications thereof.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, rotary drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary drive apparatus arranged to rotate a flywheel arranged to support a lens arranged to allow incoming light coming from a light source to pass therethrough, the rotary drive apparatus comprising:
    a motor including a rotating portion; and
    the flywheel, the flywheel being supported by the motor and arranged to rotate about a central axis extending in a vertical direction; wherein
    the flywheel includes:
        a plate-shaped accommodating portion in which the lens is arranged;
        a bottom surface arranged at a bottom portion of the accommodating portion, and arranged to slant with respect to at least one of two opposed side surfaces of the lens; and
        a base surface arranged to be in contact with at least a portion of another one of the two opposed side surfaces of the lens;
    the lens allows reflected light obtained by reflection of incoming light in the flywheel to pass therethrough; and
    the base surface is a radially outermost surface positioned radially outward from the lens and defines a portion of the accommodating portion, the base surface overlaps the lens when viewed from a radial direction and is perpendicular to a lower surface of the flywheel.

2. The rotary drive apparatus according to claim 1, wherein the bottom surface is arranged to slant with respect to the base surface.

3. The rotary drive apparatus according to claim 1, wherein the portion of the other one of the two opposed side surfaces of the lens, the portion being in contact with the base surface, is fixed to the base surface through adhesion.

4. The rotary drive apparatus according to claim 1, wherein the bottom surface is arranged to slant with respect to the base surface.

5. The rotary drive apparatus according to claim 1, wherein the bottom surface is a flat surface or a curved surface.

6. A rotary drive apparatus arranged to rotate a flywheel arranged to support an optical component arranged to reflect incoming light coming from a light source or allow the incoming light to pass therethrough, the rotary drive apparatus comprising:
    a motor including a rotating portion; and
    the flywheel, the flywheel being supported by the motor and arranged to rotate about a central axis extending in a vertical direction, wherein
    the flywheel includes:
        a plate-shaped accommodating portion in which the optical component is arranged;
        a bottom surface arranged at a bottom portion of the accommodating portion, and arranged to slant with respect to at least one of two opposed side surfaces of the optical component; and
        a base surface arranged to be in contact with at least a portion of another one of the two opposed side surfaces of the optical component; and
    the bottom surface is a curved surface.

7. The rotary drive apparatus according to claim 6, wherein the optical component is a mirror arranged to reflect the incoming light.

8. The rotary drive apparatus according to claim 7, wherein the base surface is an inclined surface angled with respect to the central axis.

9. The rotary drive apparatus according to claim 7, wherein the portion of the other one of the two opposed side surfaces of the optical component, the portion being in contact with the base surface, is fixed to the base surface through adhesion.

\* \* \* \* \*